M. K. HOPKINS.
FUSIBLE LINK.
APPLICATION FILED JULY 15, 1918.
1,405,588.
Patented Feb. 7, 1922.
2 SHEETS—SHEET 1.
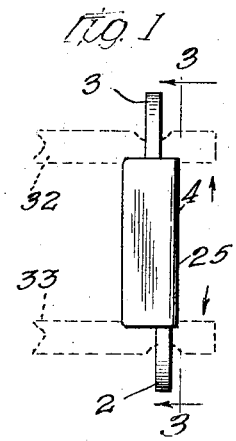
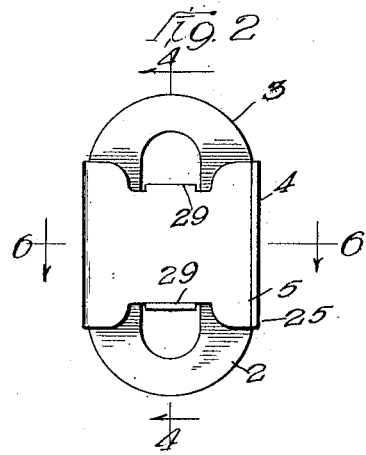
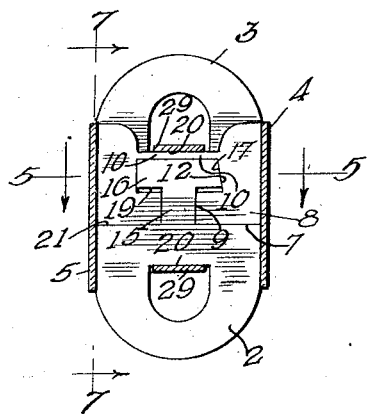
Witnesses:
Harry R. L. White
W. P. Kilroy
Inventor:
Morton K. Hopkins
By Hiee & Hiee
Attys.

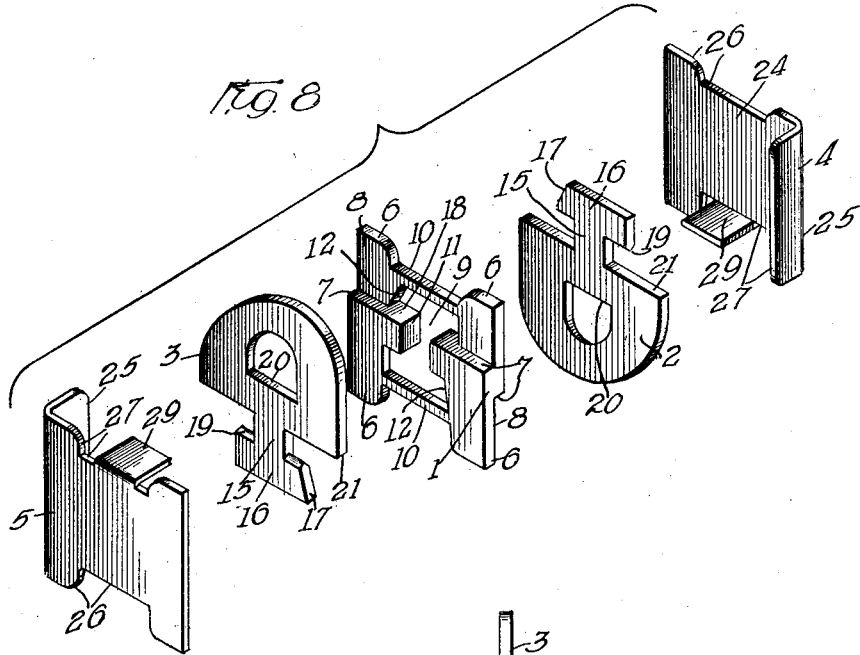

UNITED STATES PATENT OFFICE.

MORTON K. HOPKINS, OF CHICAGO, ILLINOIS, ASSIGNOR TO JOHN L. KENNEDY, OF CHICAGO, ILLINOIS.

FUSIBLE LINK.

1,405,588.        Specification of Letters Patent.      Patented Feb. 7, 1922.

Original application filed May 6, 1918, Serial No. 232,911. Divided and this application filed July 15, 1918. Serial No. 245,105.

*To all whom it may concern:*

Be it known that I, MORTON K. HOPKINS, a citizen of the United States, residing at Chicago, in the county of Cook and State of Illinois, have invented certain new and useful Improvements in Fusible Links, of which the following is a description.

My invention belongs to that general class of devices known as fusible links, which under normal conditions will securely connect cooperating parts or mechanism, but under abnormal conditions release the same. Devices of this kind are used for many purposes, but are particularly desirable and generally used for automatic sprinkler heads and my improved link is especially adapted for that use, but obviously may be used wherever found desirable. The invention has among its objects the production of a device of the kind described that is simple, convenient, durable, compact, efficient and satisfactory. It has particularly as an object the production of a device that will be extremely strong and efficient under normal conditions, but which under abnormal conditions will quickly, satisfactorily and reliably release. It also has as an object the production of a device that may be substantially entirely enclosed so that it will not be apt to corrode, or for any other reason be rendered inoperative in an emergency. Many other objects and advantages of the construction herein shown and described will be obvious to those skilled in the art from the disclosures herein given. This is a division of my pending application Serial Number 232,911, filed May 6, 1918.

To this end, my invention consists in the novel construction, arrangement and combination of parts herein shown and described and more particularly pointed out in the claims.

In the drawings, wherein like reference characters indicate like or corresponding parts, Fig. 1 is a side elevation of one form of my device;

Fig. 2 is a front view of the same;

Fig. 3 is a sectional view substantially on line 3—3 of Fig. 1;

Fig. 4 is a sectional view taken substantially on line 4—4 of Fig. 2;

Fig. 5 is a sectional view taken substantially on line 5—5 of Fig. 3;

Fig. 6 is a sectional view taken substantially on line 6—6 of Fig. 2;

Fig. 7 is a sectional view taken substantially on line 7—7 of Fig. 3;

Fig. 8 is a perspective view of the parts disassembled, showing their relative positions; and Fig. 9 is a side elevation with the guards removed, showing the device while the parts are releasing.

Referring to the drawings, the link consists of a key member or part 1 and a pair of cooperating plate members 2 and 3, and if desired cover plates 4 and 5. Members 2 and 3 are preferably similar as are also cover parts 4 and 5, the description of one of each of the pairs will therefore suffice for both. It may be mentioned that the parts hereafter described may be made of suitable material and of the desired size and shape, this ordinarily depending upon the particular use to which the link is to be put.

Part 1 consists of a divided central body portion having end portions 6—6, which are joined to the central portion at each side, there being an offset or shoulder 7—7 at opposite sides, the offset being preferably equal to the thickness of the end portions 6 so that the face portion 8 at one end is substantially in alignment with the face portion 8 at the opposite end on the opposite side. The body or central portion is preferably cut away as at 9, leaving extending parts 11 constituting key plate engaging means, the two side portions being connected by the cross parts 10—10, the opening in the construction shown substantially a double T-shaped opening, or opening the shape of an H. I have shown one end of each opening at an angle as at 12, the purpose of this being more fully explained hereafter.

Each of the parts or plates 2 and 3 consists of a body formed with a substantially T-shaped key member engaging part 15—16, the plate being in the preferred construction of a thickness equal to the offset or the thickness of the end parts 6 of the body 1. The part 15 is preferably of a size to fit the opening 9. The extending part 16 is of a size to fit the opening between the parts 6—6, bar 10 and central extending parts 11. The same is also cut as at 17 where it is to be used on a key plate formed as at 12. The under face 19 at each side of the key engaging means or part 16 is arranged to bear against and engage the surface 18 on parts 11, and the edge 21 with the shoulder 7 on the other side of the parts 11. I generally prefer to form the edge at 19 so that substantially a knife edge is formed. I have shown the same at about the center, it being understood that it may be varied as desired. The opposite end of part 2 may be formed as desired, the same preferably having an opening 20 therein. The parts 2 and 3 are assembled substantially as shown in Figs. 3 and 7 so that the ends 2 and 3 project beyond the bars 10 at each end of the body 1, but on opposite sides thereof, the thickness of the three parts being equal to the thickness of the central portion of the body part 1 (see Fig. 7).

Each cover plate consists of a body portion 24 having the flange 25, one end being cut as at 26 and the other as at 27, so as to substantially conform to the contour of the body part 1, as is most clearly shown in Fig. 2. At one end is provided a prong or extending part 29.

When the parts 1, 2 and 3 are assembled together (see Figs. 2 and 4), cover plates 4 and 5 may be arranged as shown with the prongs or parts 29 at the end extending through the opening 20 and engaging the bar 10 with the flanges 25 at each side. The assembled parts 1, 2 and 3 are detachably secured together by means of suitable solder or the equivalent, so that when a certain amount of heat reaches the link parts they will be easily separated or released. The cover plates 4 and 5 arranged on the link portions are also soldered about the edges by suitable solder of the desired melting point, the same serving as a cover or seal so that dirt and moisture is kept from the parts of the links and corrosion prevented. I have shown in Fig. 1 members 32 and 33, the same representing any cooperating mechanism to be secured together by the link. When heat is applied to the link, it being understood that ordinarily pressure is as indicated by the arrows shown in Fig. 1, the solder is fused and the strain on the ends of parts 2 and 3 throws the parts (the cover plates not shown) substantially into the positions shown in Fig. 9, causing them to release. By making the openings and bars 16 as shown, or in an equivalent manner, it is necessary to assemble the parts in a predetermined manner should that be desired. It will be noted that when the parts are secured together substantially as shown in Fig. 7 and strain applied on the parts 2 and 3, there may be a considerable pull on the parts upon each other with no possible chance for springing. In fact the strength of the link is practically equal to the strength of the material. When, however, the solder is fused or melted, the parts tend to quickly and positively release.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. A fusible link comprising members formed to lie one upon the other with the free ends extending in opposite directions, each member being provided with key engaging means, in combination with a cooperating key member formed with an opening therein and offset parts on opposite sides thereof, the opposed members each having neck and head portions insertable within the opening in the key, the head portions thereof cooperating with the offset shoulders of the key, whereby the parts may be arranged in a substantially unitary formation, substantially as described.

2. A fusible link comprising duplicate members formed to lie one upon the other with their free ends extending in opposite directions, each of said members comprising a body part, a reduced neck and a head on the free end of the neck, in combination with a key member therefor comprising a yoke formed with overlapping halves on opposite sides thereof, each of said halves being provided with a channel adapted to loosely receive the neck of the duplicate part and an enlarged portion formed to receive the head of the neck, whereby the parts may be arranged to form a substantially unitary structure for the purpose set forth.

3. A fusible link comprising duplicate members formed to lie one upon the other with their free ends extending in opposite directions, each of said members comprising a body part, a reduced neck and a head on the free end of the neck, in combination with a key member therefor comprising a yoke formed with overlapping halves on opposite sides thereof, each of said halves being provided with a channel adapted to loosely receive the neck of the duplicate part and an enlarged portion formed to receive the head of the neck, whereby the parts may be arranged to form a substantially unitary structure for the purpose set forth, and means for encasing said structure.

4. A fusible link comprising duplicate members formed to lie one upon the other with their free ends extending in opposite directions, each of said members comprising a body part, a reduced neck and a head on the free end of the neck, in combination with a key member therefor comprising a yoke formed with overlapping halves on opposite sides thereof, each of said halves being provided with a channel adapted to loosely receive the neck of the duplicate part, and an enlarged portion formed to receive the head of the neck.

5. A fusible link comprising duplicate members formed to lie one upon the other with their free ends extending in opposite directions, each of said members comprising a body part, a reduced neck and a head on the free end of the neck, in combination with a key member therefor comprising a yoke formed with substantially offset halves on opposite sides thereof, each of said halves being provided with a channel adapted to loosely receive the neck of the corresponding duplicate part, and an enlarged portion formed to receive the head on the neck, some of the contacting portions between the said key and duplicate members being formed to provide a line contact bearing between the parts to accelerate the disengagement of the parts, substantially as described.

6. A fusible link comprising duplicate members formed to lie one upon the other with their free ends extending in opposite directions, each member being formed with a key engaging portion, in combination with a cooperating key therefor having an aperture therein and offset parts on opposite sides thereof for cooperating with the key engaging portions of the duplicate members, each offset part of the key being adapted to lie within the plane of the corresponding duplicate member when the parts are assembled.

7. A fusible link comprising opposed members formed to lie one upon the other with their free ends extending in opposite directions, each member being formed with a key engaging head and a reduced neck portion, in combination with a cooperating key having an opening therein of the configuration of the said heads and neck portions of the opposed members, said key also having offset shoulders adapted to cooperate with the heads of the opposed members to maintain the same in position.

8. A fusible link comprising opposed members formed to lie one upon the other, with their free end extending in opposite directions, each member being formed with a key engaging head and a reduced neck portion, in combination with a cooperating key having an opening therein of the configuration of the said heads and neck portions of the opposed members, said key also having offset parts adapted to cooperate with the heads of the opposed members to maintain the same in position, each offset part of the key lying within the plane of the corresponding opposed member when the parts are assembled, substantially as described.

In testimony whereof, I have hereunto signed my name in the presence of two subscribing witnesses.

MORTON K. HOPKINS.

Witnesses:
 Roy W. Hill,
 Charles I. Cobb.